United States Patent Office 3,023,116
Patented Feb. 27, 1962

3,023,116
METHOD FOR FORMING CONCRETE STRUCTURES WHICH SET IN PLACE WHILE FLOATING

Harvey E. Alford, Amherst, and Franklin Veatch, Lyndhurst, Ohio, assignors to The Standard Oil Company, Cleveland, Ohio, a corporation of Ohio
No Drawing. Filed Sept. 24, 1959, Ser. No. 841,934
6 Claims. (Cl. 106—90)

This invention relates to a novel concrete mix composition incorporating hollow glass spherical particles as aggregate and a surface-active agent; to floating concrete prepared therefrom; and, more particularly, to a method for forming rigid, permanent floating concrete structures in a body of water by introducing said novel concrete mix composition directly to the surface of the water where it will set in place while floating thereon.

It has long been known that various lightweight materials, such as expanded perlitic materials, vermiculite, pumice stone, expanded mica, etc., may be used in concrete as a full or partial replacement for sand to make lightweight concretes. A very desirable lightweight material for use as aggregate for preparing concretes, mortar, plasters and like masonry is the lightweight product described in co-pending application Serial No. 691,726, now U.S. Patent 2,978,340, assigned to our assignee. This product when observed under considerable magnification is seen as a mass of small, discrete, hollow, spherical glass particles which are substantially hole-free. Light-weight concretes incorporating these particles exhibit excellent strength-to-weight characteristics and due to the spherical shape of these particles, they provide very mobile wet mixes with cement and water and hence, have very desirable working properties. These hollow glass spheres are prepared from discrete particles of feed which form a glass upon fusion thereof and a blowing agent. For example, a preferable feed material is disclosed as comprising a uniform mixture of sodium silicate as a primary component containing 2.5 to 25% boric acid and 0.8 to 5.0% urea by weight based on the silicate as anhydrous silicate. A typical product, for example, has particles within the size range of 10 to 350 microns, with an average diameter of 100 microns. The gas density of these particles depends primarily upon the relationship of the volume of the spheres to wall thickness. Generally, the density may be controlled within the range of 0.25 to 0.45 gram/cubic centimeter (cc.), but may range from 0.1 to 0.75 gram/cc. Wall thickness of these particles is surprisingly thin and may be expressed as a percentage of the diameter of the spheres, preferably being about 0.75 to 1.5% in particles having a size of 10 to 500 microns. For example, a sphere having a diameter of 350 microns and a gas density of 0.3 gram/cc. would have a wall thickness of 4 microns, a little more than 1% of the diameter. The preferred method and apparatus for the preparation of such particles is disclosed in co-pending application Serial No. 691,725, assigned to our assignee. The description in both of these co-pending applications is incorporated herein by reference to the extent as may be required for the clear and complete understanding of these hollow glass particles.

If a sufficient amount of lightweight material is incorporated, a concrete may be made which will have a specific gravity less than one and the concrete will float on water. Due to their hole-free nature, the hollow glass particles described in co-pending application Serial No. 691,726 are particularly desirable for preparing floating concrete since they are not penetrated by water as readily as many other lightweight particles which are of a communicating vesicular nature. For this reason, concrete incorporating these small glass spherical particles maintains its original bouyancy in contrast to concretes prepared with perlite or vermiculite which, although having an original density less than water, gradually allows the penetration of water by capillarity with a commensurate decrease in buoyancy.

The present invention is directed to the finding that if a small amount of a cationic surface-active material is incorporated into a concrete mix composition consisting of Portland cement as the binder and hollow glass particles as the aggregate, the resulting concrete mix composition may be introduced directly to the surface of a body of water where it will set in place while floating on the water to form a rigid, permanent floating concrete mass. If the surface-active agent is not included, it is found that an excessive amount of the mix will sink when it is added to the surface of the water and the setting characteristics of the concrete which remains floating is less than satisfactory with, of course, commensurate deficiencies in strength characteristics.

The novel method of the present invention makes it possible, therefore, to cast desirable structures in place on the surface of the water where the structure is to be used. Prior to the present discovery, floating concrete structures were required to be first pre-cast in the desired shape or in sections of the desired shape and then placed in water or, if cast in sections, assembled on the surface of the water. The present invention, therefore, simplifies the work of preparing floating concrete structures and eliminates the cost of transporting pre-cast shapes to the desired installation position in water.

In executing the method of the invention on the surface of a large body of water, a floating form may be inserted in the water to outline the boundaries of the desired floating structure. Any desired means may be used for the form; and since little strength will normally be required, such form may be provided for at little expense. For example, a floating form may be fabricated of pre-cast members of a floating concrete incorporating hollow glass particles as the aggregate, which may then become an integral part of the final structure as the open area encompassed by such form is filled in with the concrete mix composition of the invention. By this means it will be possible, for example, to construct working platforms in deep water locations or to make permanent or temporary roadways through swampy or marsh land areas. The relative ease of executing the method of the present invention will undoubtedly suggest many other applications for floating concretes to those skilled in the art.

The concrete mix composition of the invention consists in large part of the hollow glass particles as the aggregate and a cementitious binder which is capable of chemically combining with water admixed therewith to harden or set to form an article of substantial load-bearing strength. The binder for concrete is usually a mixture of calcium aluminates and silicates prepared by burning a mixture of calcareous and argillaceous materials to clinkering temperature and grinding the resulting clinker. Such a binder is generally referred to as Portland cement. Various other ingredients may be included in the cement to effect in one manner or another the chemical phenomenon of hydration involved in the setting or hardening action.

The amount of hollow glass spheres in the concrete mix may vary in a fairly broad range depending upon the strength and the final specific gravity desired for the concrete structure, with the limitation that the specific gravity of the mix must be maintained under 1.00, and preferably less than 0.80, so that it will float on the water when it is introduced thereon in accordance with the method of the invention. The smallest amount of hollow glass spheres to accomplish the desired results will be at least 35% by weight of the mix, but preferably not less than 50% by weight of the mix. For strength reasons, the amount of hollow glass spheres will generally not exceed 65% by weight of the mix. When expressed on a volume basis, this represents a binder-to-aggregate volumetric ratio of from 1:3 to 1:11 when the aggregate is solely the hollow glass particles, and preferably 1:5 to 1:11.

It may be desirable for economic considerations in some situations to employ a certain amount of heavy aggregate such as sand as a partial replacement for the hollow glass particles. In these cases, the amount of sand that may be used will be limited by the consideration that the specific gravity of the concrete mix must be maintained under one.

It is also possible to use other lightweight material as a partial substitute for the hollow glass spheres such as, for example, expanded perlite, mica, and vermiculite; or spherulized clay particles, or hollow plastic spheres such as disclosed in U.S. 2,797,201. It is to be understood, however, that these materials—even the spherulized clay particles and hollow plastic spherical particles—do not provide results equivalent to the use of hollow glass particles in the method of the present invention. Even though the specific gravity of the mix may not be appreciably affected by the use of these lightweight materials as a substitute for part of the hollow glass spheres, their use causes the amount of mix which sinks when the final concrete composition is added to water to increase appreciably, as well as adversely affecting the time to obtain a satisfactory set and, for these reasons, the use of these materials is to be held to a minimum.

The surface-active agent used in the mix composition may be selected from the cationic type of surfactants. Illustrative of these materials are the non-quaternary nitrogen bases such as primary aliphatic amines, preferably those in which the aliphatic group is $C_{12}$ to $C_{18}$; polyethenoxy derivatives of such primary amines; diamines, such as N aliphatic substituted propylene diamines in which the aliphatic group is preferably $C_{12}$ to $C_{18}$; amide-linked amines, imidazoline derivatives made by condensing a fatty acid, preferably a fatty acid of a $C_{12}$ to $C_{18}$ chain length, with ethylenediamine and eliminating water; and quarternary nitrogen bases such as made by reacting an alkyl halide in which the alkyl group is $C_{12}$ to $C_{18}$ with a tertiary amine such as trimethyl amine or by reacting an alkyl sulfate in which the alkyl group is $C_{12}$ to $C_{18}$ with a ternary base.

Surface-active agents of the anionic class have actually been found to increase the amount of concrete mix which will sink when the composition is added to water. The nonionic class of surface-active materials have been found to offer little or no improvement.

The amount of surface-active material will vary but at least 0.5% by weight of the concrete mix is required to effect any significant results. Normally, the use of more than 10% by weight cannot be justified economically. The desired cationic agent should be thoroughly mixed with the combination of hollow glass particles and cement so that it is evenly dispersed throughout the mixture. Any desired means may be employed to accomplish this, and the cationic agent may be incorporated in the mix well in advance of its intended use and it is preferable, although not essential, that the mixing be accomplished in time so that the concrete mix composition containing the surface-active material can stand a day or more before its introduction onto the water.

The final concrete mix composition may be added to the surface of the water in dry or wet form. Preferably an amount of water is first added to the dry composition sufficient to make the mixture pourable so that the composition may be readily introduced onto the surface of the water. Obviously the amount of water to be added to the dry composition will vary depending upon the preference of the worker and will be readily suggested to those skilled in the art.

The following working example illustrates the best mode contemplated for executing the method of the invention.

*Example A*

Approximately 50 grams of binder and aggregate, representing 1 part by volume Portland cement, 0.2 part by volume sand, and 2.75 parts by volume hollow glass particles, were mixed together in a small can with the use of a spatula. The hollow glass particles used had a bulk density of 0.20 gram/cc. and a size range of 10 to 300 microns with an average diameter of 100 microns. These particles were formed from a feed material consisting of a uniform mixture of sodium silicate, boric acid and urea in the proportions of 40 parts sodium silicate $Na_2O(SiO_2)_{3.22}$, 5.6 parts of $H_3BO_3$ and 1 part urea (on a dry basis) and was prepared in accordance with the preferred embodiment previously mentioned in co-pending application Serial No. 691,726. To this mixture was added with thorough mixing 1% by weight 1-(2-hydroxy ethyl)-2-heptadecenyl-imidazoline, commercially available from Carbide and Carbon Chemicals Company under the trade designation "Amine 220." After mixing, the composition was allowed to stand overnight. On the next day water was blended into the mix and the mix was worked until a pourable composition was obtained. This composition was then poured onto the surface of 200 cc. of water in a 300 cc. beaker. The composition spread out covering the entire surface of the water in the beaker taking the shape defined by the walls of the glass container. The mixture floated on the surface of the water with little sinkage occurring (less than 5% by volume). The top layer of the mix was lightly troweled to give a smooth surface. A hard set was obtained after 24 hours.

Example A was repeated varying the concentration of the cationic surface-active material. It was found that as the amount of this agent was decreased below the 1% by weight used in Example A, the amount of sinkage and the time to obtain a hard set increased slightly. At a concentration below 0.5% by weight, however, the sinkage increased to a degree of more than 10% by volume and was considered excessive. Furthermore, when the concentration of the cationic agent was reduced below 0.5% by weight, more than 48 hours was required to obtain a hard set. At concentrations above 1% a modest improvement in sinkage was obtained with little significant change observed in the setting characteristics of the composition. These tests indicate that at least 0.5% by weight of the cationic agent should be used in the mix in order to effect the desired results.

To illustrate the effect of incorporating the surface-active material in the concrete mix composition, working Example A was repeated in one test where no surface-active material was employed and in subsequent tests where the choice of the surface-active material was varied. The amount of surface-active material was held constant at 1% by weight of the concrete mix in each of the tests. The results of these test runs, B through G, are reported in the table below:

| Test run | Surface-active agent | Class of agent | Sinkage | Set characteristics |
| --- | --- | --- | --- | --- |
| B | None | None | Over 25% by volume. | No hard set. Weak set after 24 hours. |
| C | Sodium salt of sulfated stearyl alcohol. | Anionic | Substantially all. | None. |
| D | Tall oil | do | do | Do. |
| E | Polyoxy ethylene ester of oleic acid. | Nonionic | Over 25% | No hard set. Weak set after 72 hours. |
| F | Sorbitol mono oleate. | do | Over 10% | Do. |
| G | Hexadecyl trimethyl ammonium chloride. | Cationic | Less than 5% | Hard set after 24 hours. |

It will be apparent from the results obtained for B in the above table that a satisfactory hard set is not obtained without a surface-active agent. The results for C and D indicate that the use of an anionic surface-active agent causes the sinkage to actually increase. The results for E and F indicate that the use of a nonionic surface-active agent offers little improvement in preventing sinkage and does not produce a hard set.

It is to be understood that various modifications of the method of the present invention will suggest themselves to those skilled in the art upon the reading of the foregoing description. It is intended that all such modifications be included as may be defined by the appended claims.

We claim:

1. A method for forming a rigid, permanent floating concrete mass in a body of water comprising the steps of introducing onto the surface of the water a concrete mix composition consisting essentially of Portland cement as the binder and hollow, hole-free, glass spheres having a diameter of from 5 to 5000 microns and a gas density of from 0.1 to 0.75 gram/cc. as the aggregate, the volumetric ratio of binder to aggregate being within the range of 1:3 to 1:11, and containing at least 0.5% by weight a cationic surface-active agent evenly dispersed therein, and permitting said concrete mix to set in place while floating on the surface of the water.

2. A method for forming a rigid, permanent floating concrete mass in a body of water comprising the steps of introducing onto the surface of the water a pourable water slurry of a concrete mix composition consisting essentially of Portland cement as the binder and hollow, hole-free, glass spheres having a diameter of from 5 to 5000 microns and a gas density of from 0.1 to 0.75 gram/cc. as the aggregate, the volumetric ratio of binder to aggregate being within the range of 1:3 to 1:11, and containing at least 0.5% by weight 1-(2-hydroxy ethyl)-2-heptadecenyl-imidazoline evenly dispersed therein, and permitting said concrete mix to set in place while floating on the surface of the water.

3. A method for forming a rigid, permanent floating concrete mass in a body of water comprising the steps of introducing onto the surface of the water a pourable water slurry of a concrete mix composition consisting essentially of Portland cement as the binder and hollow, hole-free, glass spheres having a diameter of from 5 to 5000 microns and a gas density of from 0.1 to 0.75 gram/cc. as the aggregate, the volumetric ratio of binder to aggregate being within the range of 1:3 to 1:11, and containing at least 0.5% by weight hexadecyl trimethyl ammonium chloride evenly dispersed therein, and permitting said concrete mix to set in place while floating on the surface of the water.

4. A lightweight concrete mix composition consisting essentially of Portland cement as the binder and hollow, hole-free, glass spheres having a diameter of from 5 to 5000 microns and a gas density of from 0.1 to 0.75 gram/cc. as the aggregate, the volumetric ratio of binder to aggregate being within the range of from 1:3 to 1:11, and containing at least 0.5% by weight a cationic surface-active agent evenly dispersed therein.

5. A lightweight concrete mix composition consisting essentially of Portland cement as the binder and hollow, hole-free, glass spheres having a diameter of from 5 to 5000 microns and a gas density of from 0.1 to 0.75 gram/cc. as the aggregate, the volumetric ratio of binder to aggregate being within the range of from 1:3 to 1:11, and containing at least 0.5% by weight 1-(2-hydroxy ethyl)-2-heptadecenylimidazoline evenly dispersed therein.

6. A lightweight concrete mix composition consisting essentially of Portland cement as the binder and hollow, hole-free, glass spheres having a diameter of from 5 to 5000 microns and a gas density of from 0.1 to 0.75 gram/cc. as the aggregate, the volumetric ratio of binder to aggregate being within the range of from 1:3 to 1:11, and containing at least 0.5% by weight hexadecyl trimethyl ammonium chloride evenly dispersed therein.

References Cited in the file of this patent

UNITED STATES PATENTS

| | | |
|---|---|---|
| 2,782,857 | Clark | Feb. 26, 1957 |
| 2,796,131 | Hinchliffe | June 18, 1957 |
| 2,797,201 | Veatch | June 25, 1957 |
| 2,800,963 | Roberts | July 30, 1957 |